United States Patent
Kim et al.

(10) Patent No.: US 9,615,014 B2
(45) Date of Patent: Apr. 4, 2017

(54) PORTABLE DEVICE CONTROLLING UNMANNED AERIAL VEHICLE AND METHOD OF CONTROLLING THEREFOR

(71) Applicant: LG ELECTRONICS INC., Seoul (KR)

(72) Inventors: Jihwan Kim, Seoul (KR); Kihyung Kim, Seoul (KR); Sihwa Park, Seoul (KR); Kichu Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 450 days.

(21) Appl. No.: 14/338,847

(22) Filed: Jul. 23, 2014

(65) Prior Publication Data

US 2015/0341540 A1 Nov. 26, 2015

(30) Foreign Application Priority Data

May 22, 2014 (KR) ........................ 10-2014-0061515

(51) Int. Cl.
| | | |
|---|---|---|
| *H04N 5/232* | (2006.01) |
| *H04N 5/28* | (2006.01) |
| *G06F 3/01* | (2006.01) |
| *G06F 3/0488* | (2013.01) |
| *G06F 3/0481* | (2013.01) |
| *H04N 5/225* | (2006.01) |

(52) U.S. Cl.
CPC ......... *H04N 5/23203* (2013.01); *G06F 3/013* (2013.01); *G06F 3/0488* (2013.01); *G06F 3/04815* (2013.01); *H04N 5/2251* (2013.01); *H04N 5/28* (2013.01)

(58) Field of Classification Search
CPC .... B64D 47/08; H04N 5/23277; H04N 5/232; G03B 15/006; G06K 2017/0045
See application file for complete search history.

(56) References Cited

U.S. PATENT DOCUMENTS

| | | | |
|---|---|---|---|
| 7,773,116 B1 * | 8/2010 | Stevens | F41G 3/02 |
| | | | 348/144 |
| 9,380,275 B2 * | 6/2016 | Davidson, Jr. | H04N 7/183 |
| 2008/0290164 A1 * | 11/2008 | Papale | F41G 3/02 |
| | | | 235/414 |
| 2009/0157233 A1 | 6/2009 | Kokkeby et al. | |
| 2010/0004802 A1 * | 1/2010 | Bodin | G05D 1/0094 |
| | | | 701/11 |

(Continued)

*Primary Examiner* — Hung Dang
*Assistant Examiner* — Sunghyoun Park
(74) *Attorney, Agent, or Firm* — Birch, Stewart, Kolasch & Birch, LLP

(57) ABSTRACT

The present specification relates to a portable device controlling an unmanned aerial vehicle and a method of controlling therefor. According to one embodiment, a method of controlling a portable device controlling an unmanned aerial vehicle capturing an image includes the steps of obtaining first image information of a target object using a camera unit, transmitting a capture control signal controlling image capture for the target object to the unmanned aerial vehicle, receiving second image information of the target object captured based on the capture control signal from the unmanned aerial vehicle and generating a 3D image corresponding to the target object using the first image information and the second image information.

20 Claims, 14 Drawing Sheets

(56) References Cited

U.S. PATENT DOCUMENTS

| | | | | |
|---|---|---|---|---|
| 2010/0235034 A1* | 9/2010 | Higgins | ............... | G05D 1/0083 |
| | | | | 701/28 |
| 2011/0103293 A1* | 5/2011 | Gale | .................... | H04W 4/046 |
| | | | | 370/315 |
| 2011/0122257 A1* | 5/2011 | Kirk | ....................... | G01C 11/06 |
| | | | | 348/187 |
| 2012/0019522 A1* | 1/2012 | Lawrence | ................ | F41G 3/02 |
| | | | | 345/419 |
| 2012/0050524 A1* | 3/2012 | Rinner | .................. | G06T 7/0028 |
| | | | | 348/117 |
| 2013/0317667 A1* | 11/2013 | Kruglick | ............... | B64C 39/024 |
| | | | | 701/2 |
| 2015/0148988 A1* | 5/2015 | Fleck | .................. | G05D 1/0011 |
| | | | | 701/2 |

* cited by examiner

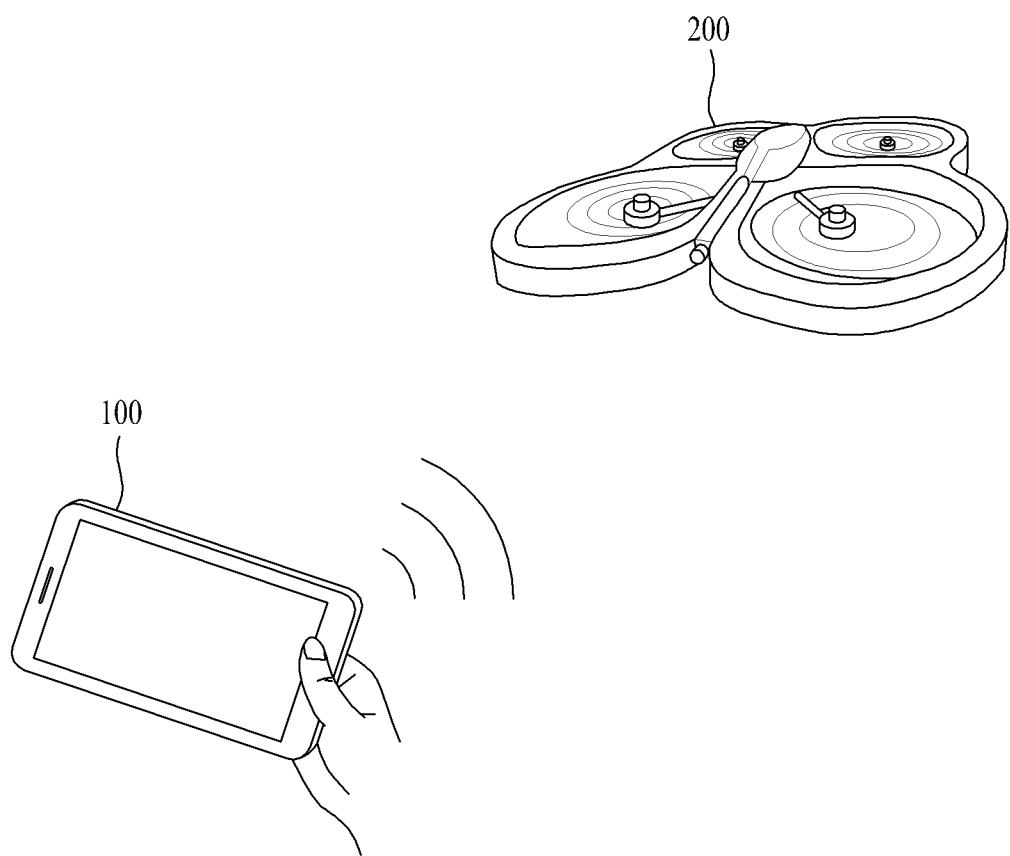

FIG. 4B
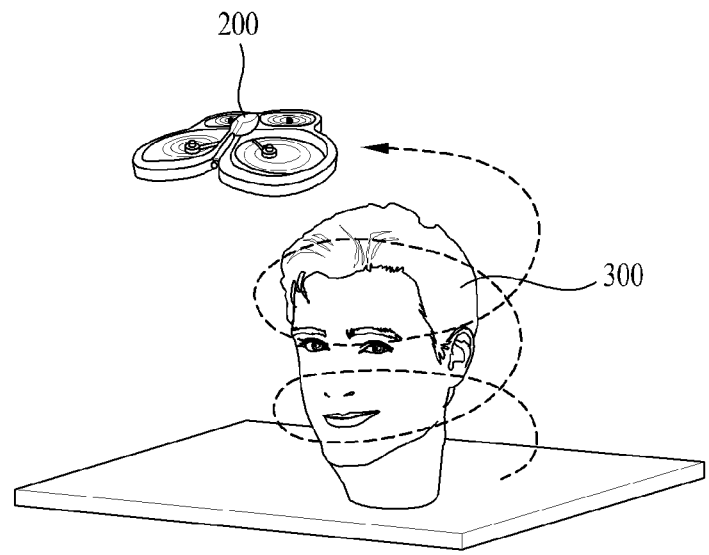
⬇ Change flight path
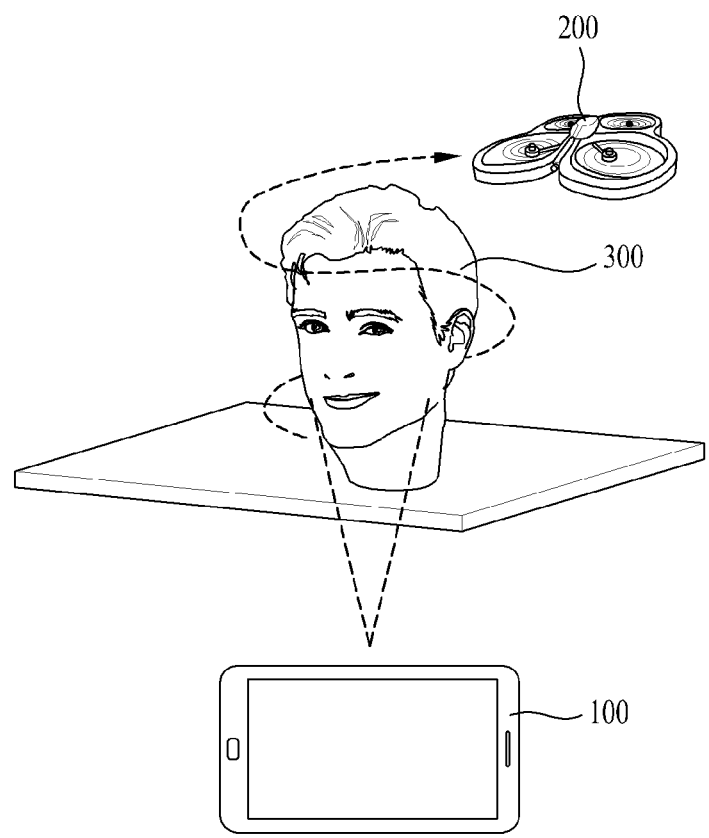

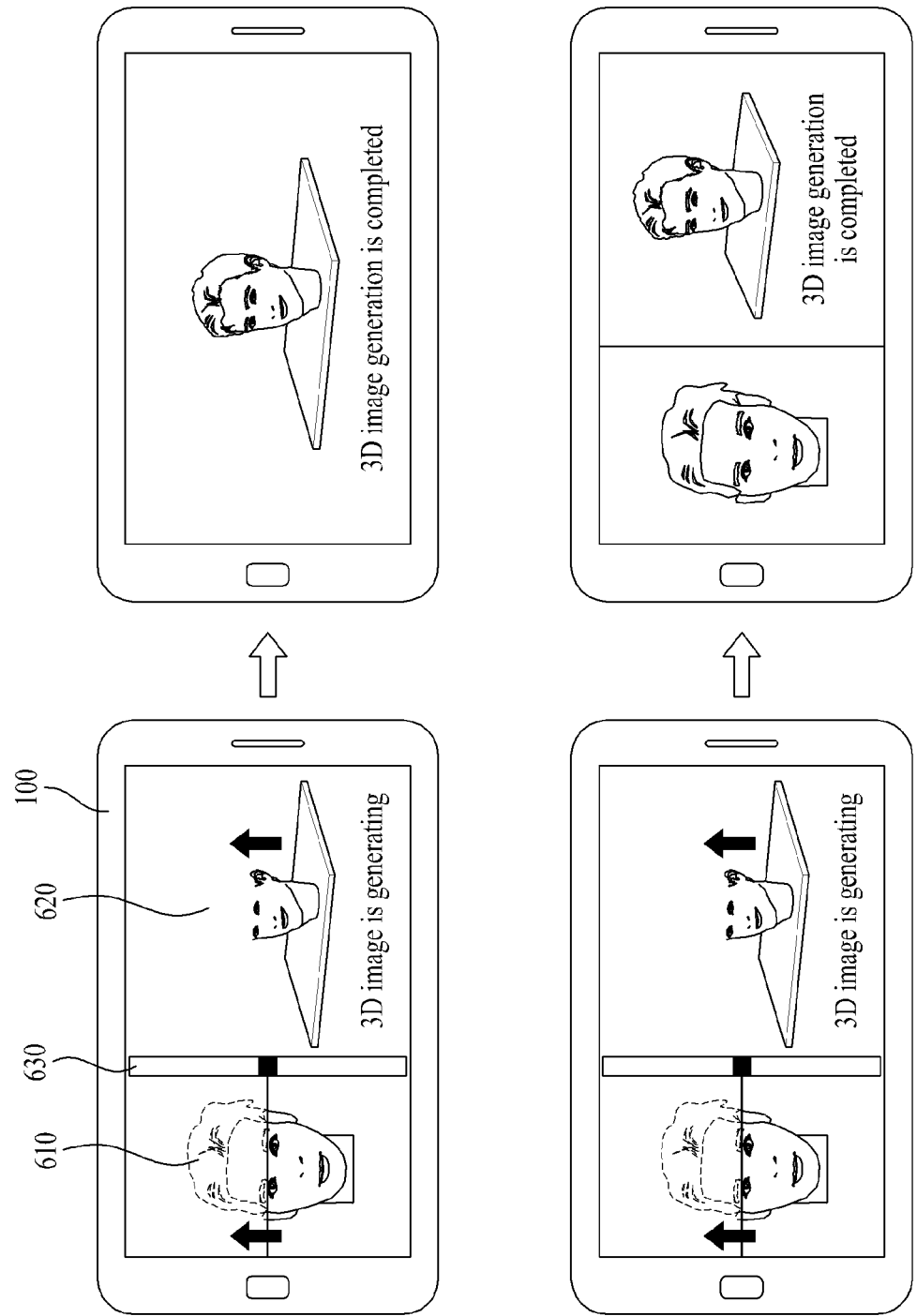

FIG. 6B
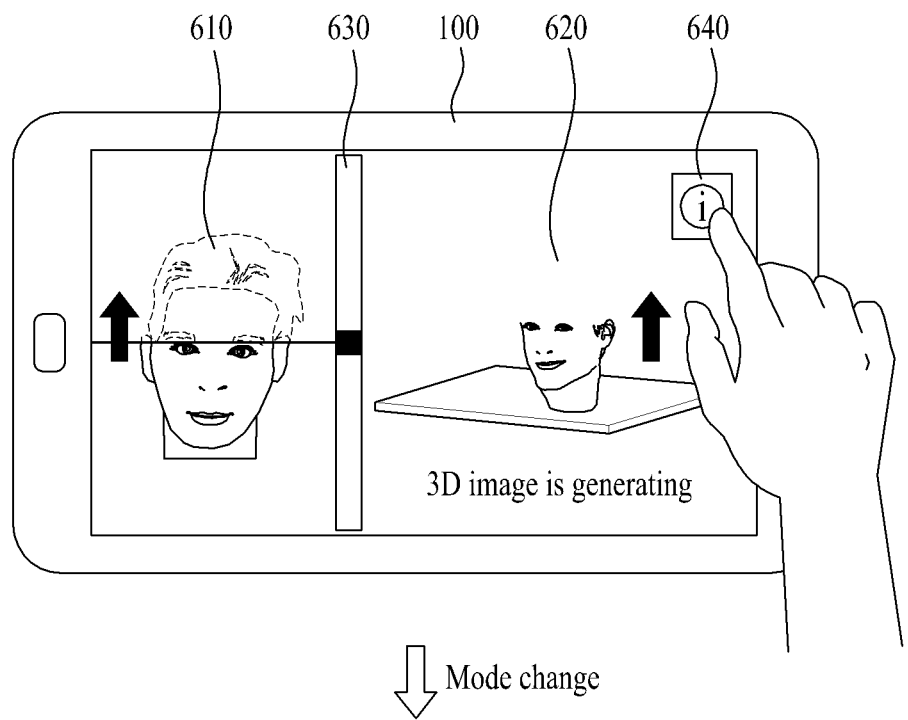
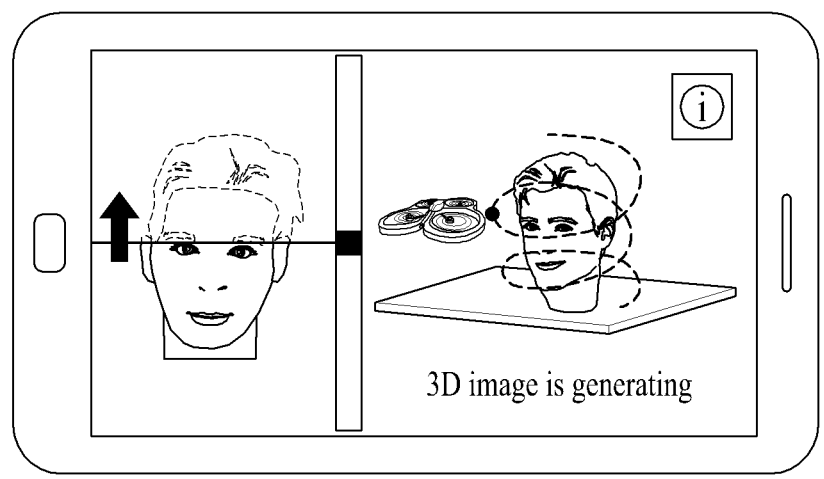

FIG. 8
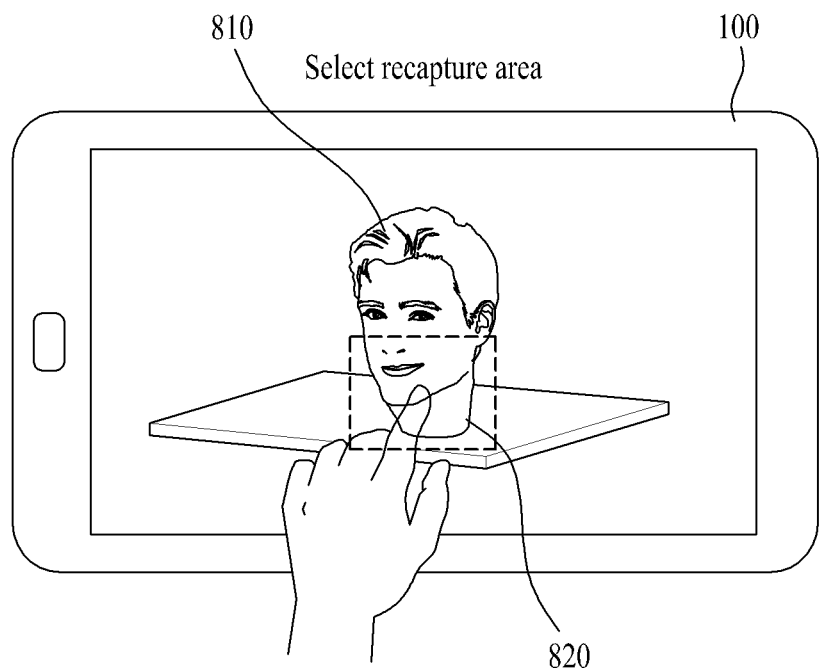
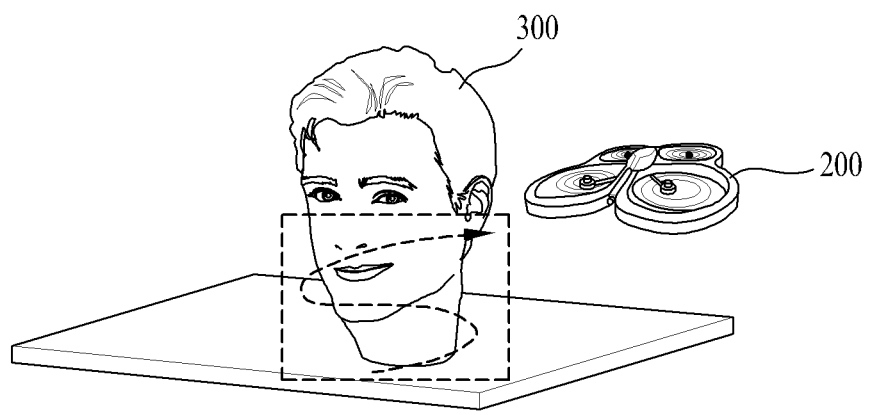

PORTABLE DEVICE CONTROLLING UNMANNED AERIAL VEHICLE AND METHOD OF CONTROLLING THEREFOR

Pursuant to 35 U.S.C. §119(a), this application claims the benefit of the Korean Patent Application No. 10-2014-0061515, filed on May 22, 2014, which is hereby incorporated by reference as if fully set forth herein.

BACKGROUND OF THE INVENTION

Field of the Invention

The present specification relates to a portable device controlling an unmanned aerial vehicle and a method of controlling therefor.

Discussion of the Related Art

An unmanned aerial vehicle indicates a remotely operated aircraft without being boarded by a person. Recently, the unmanned aerial vehicle is used for various ways including a military purpose. More specifically, a use of the unmanned aerial vehicle is diversifying in flying a dangerous region in place of a manned aerial vehicle, capturing a surrounding image and the like. And, the use of the unmanned aerial vehicle is gradually increasing as a quadcopter widely known as a drone.

As the use of the unmanned aerial vehicle is diversified, various methods of controlling the unmanned aerial vehicle are emerging. As an example, such a remote control device as a remote controller is used as the remote control device controlling the unmanned aerial vehicle.

And, the unmanned aerial vehicle can capture a video image or a still image for a real object. In this case, the remote control device can capture an image for a target object using the unmanned aerial vehicle. Yet, recently, a portable device is used as the remote control device controlling the unmanned aerial vehicle. In this case, it is required for the portable device to perform a method of performing an operation via collaboration with the unmanned aerial vehicle. And, the portable device can generate a 3D image using a plurality of images. In this case, it is required for the portable device to perform a method of generating a 3D image via collaboration with the unmanned aerial vehicle.

SUMMARY OF THE INVENTION

Accordingly, the present specification is directed to an apparatus and method thereof that substantially obviate one or more problems due to limitations and disadvantages of the related art.

An object of the present specification is to provide a portable device controlling an unmanned aerial vehicle and a method of controlling therefor.

Another object of the present specification is to provide a method for a portable device to transmit a capture control signal controlling an unmanned aerial vehicle to the unmanned aerial vehicle and receive a captured image for a real object from the unmanned aerial vehicle.

Another object of the present specification is to provide a method of generating a 3D image using image information on a target object received from an unmanned aerial vehicle and image information on the target object obtained via a camera unit.

Another object of the present specification is to provide a method for a portable device to control flight information and capture information of an unmanned aerial vehicle using a capture control signal.

Another object of the present specification is to provide a method for a portable device to control a flight path of an unmanned aerial vehicle based on location information of the portable device.

Another object of the present specification is to provide a method for a portable device to display information on a process of generating a 3D image.

Another object of the present specification is to provide a method for a portable device to detect a control input of a user and control the portable device based on the detected control input.

Another object of the present specification is to provide a method for a portable device to control a plurality of unmanned aerial vehicles.

The other object of the present specification is to provide a method for a portable device to update a generated 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a portable device controlling an unmanned aerial vehicle capturing an image can include a camera unit configured to capture a target object, a display unit configured to display visual information, a communication unit configured to communicate with the unmanned aerial vehicle (UAV) and a processor configured to control the camera unit, the display unit and the communication unit. In this case, the processor can obtain first image information of the target object using the camera unit, transmit a capture control signal controlling image capture for the target object to the unmanned aerial vehicle, receive second image information of the target object captured based on the capture control signal from the unmanned aerial vehicle and generate a 3D image corresponding to the target object using the first image information and the second image information.

To further achieve these objects and other advantages and in accordance with the purpose of the invention, as embodied and broadly described herein, according to one embodiment, a method of controlling a portable device controlling an unmanned aerial vehicle capturing an image can include the steps of obtaining first image information of a target object using a camera unit, transmitting a capture control signal controlling image capture for the target object to the unmanned aerial vehicle, receiving second image information of the target object captured based on the capture control signal from the unmanned aerial vehicle and generating a 3D image corresponding to the target object using the first image information and the second image information.

According to the present specification, it is able to provide a portable device controlling an unmanned aerial vehicle and a method of controlling therefor.

According to the present specification, a portable device can transmit a capture control signal controlling an unmanned aerial vehicle to the unmanned aerial vehicle and receive a captured image for a real object from the unmanned aerial vehicle.

According to the present specification, a portable device can generate a 3D image using image information on a target object received from an unmanned aerial vehicle and image information on the target object obtained via a camera unit.

According to the present specification, a portable device can control flight information and capture information of an unmanned aerial vehicle using a capture control signal.

According to the present specification, a portable device can control a flight path of an unmanned aerial vehicle based on location information of the portable device.

According to the present specification, a portable device can display information on a process of generating a 3D image.

According to the present specification, a portable device can detect a control input of a user and control the portable device based on the detected control input.

According to the present specification, a portable device can control a plurality of unmanned aerial vehicles.

According to the present specification, a portable device can update a generated 3D image.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram for a control environment of an unmanned aerial vehicle using a portable device;

FIG. 4a and FIG. 4b are diagrams of a method for a portable device to control a flight path of an unmanned aerial vehicle according to one embodiment of the present specification;

FIG. 6a to FIG. 6b are diagrams of a method for a portable device to display an image loading bar generating a 3D image according to one embodiment of the present specification;

FIG. 8 is a diagram of a method for a portable device to recapture a generated 3D image using an unmanned aerial vehicle according to one embodiment of the present specification;

DETAILED DESCRIPTION OF THE INVENTION

Figure 2A:
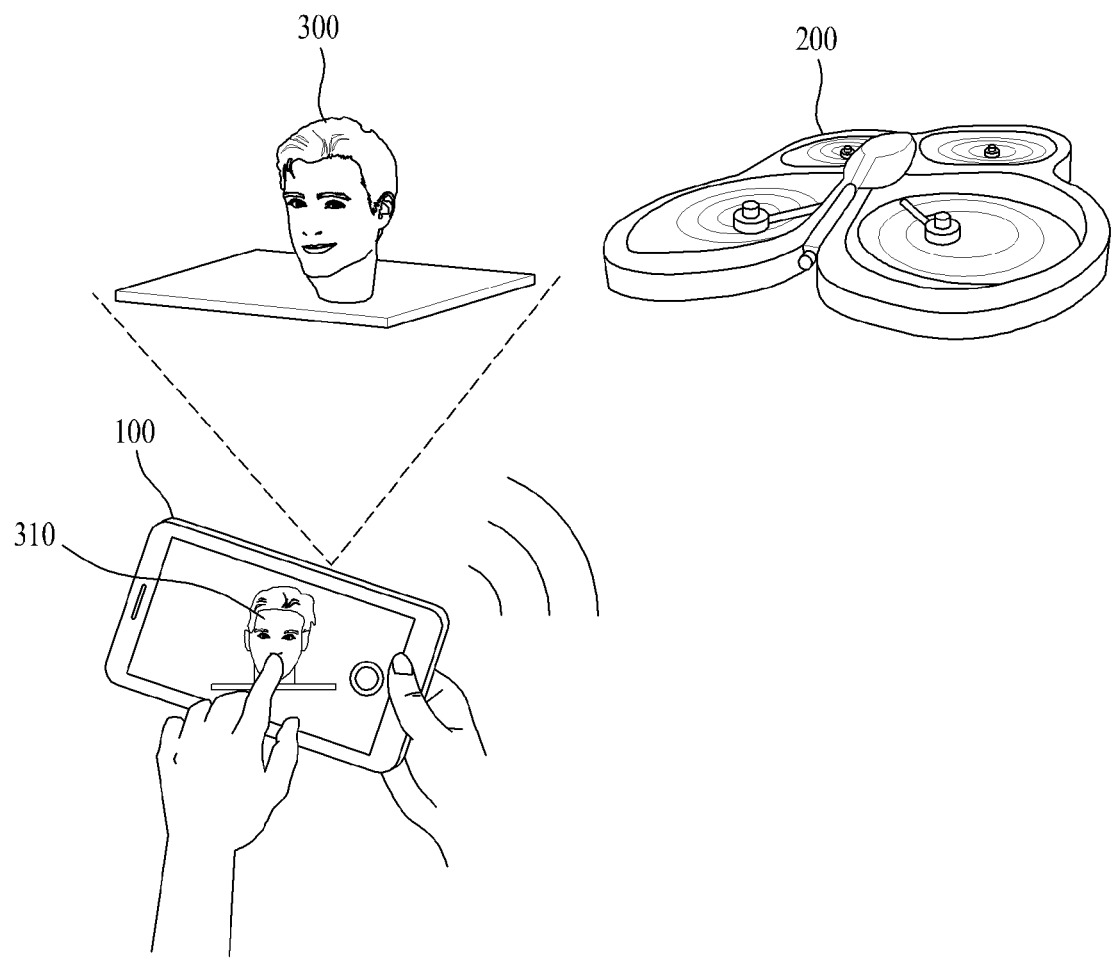
FIG. 2a and FIG. 2b are diagrams of a method for a portable device to control an unmanned aerial vehicle according to one embodiment of the present specification.

While embodiments have been described in detail with reference to the attached drawings and contents written on the drawings, the scope of claims may be non-restricted or non-limited by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In the present application, such a terminology as 'comprise', 'include' and the like should be construed not as necessarily excluding various components or steps written in the present specification but as including the components or steps in part or further including additional components or steps. And, such a terminology as 'unit' written in the present specification indicates a unit processing at least one function or an operation and can be implemented by hardware, software or a combination thereof.

FIG. 1 is a diagram for a control environment of an unmanned aerial vehicle using a portable device.

In the present specification, a portable device 100 may correspond to an electronic device controlling an unmanned aerial vehicle 200. In this case, as an example, the portable device 100 can be implemented as a single system with the unmanned aerial vehicle 200. And, as an example, the portable device 100 may correspond to a smartphone, a smart pad, a tablet, a PDA, a notebook or the like. More specifically, the portable device 100 may correspond to a mobile device equipped with a communication unit 130 capable of controlling the unmanned aerial vehicle, by which the present specification may be non-limited.

And, the portable device 100 may correspond to a head mounted display device (hereinafter abbreviated HMD). And, as an example, the portable device 100 may correspond to a wearable device capable of being worn on a body of a user. In particular, the portable device 100 may correspond to a device controlling the unmanned aerial vehicle 200 using the communication unit 130, by which the present specification may be non-limited.

And, the unmanned aerial vehicle (UAV) 200 may correspond to a device controlled by the portable device 100. As an example, although the unmanned aerial vehicle 200 is depicted as a quadcopter in FIG. 1, the unmanned aerial vehicle may correspond to a random unmanned flying object including one or more engines and/or one or more propellers. In particular, the unmanned aerial vehicle 200 may correspond to a device capable of executing an operation in a manner of being controlled by the portable device 100, by which the present specification may be non-limited.

Figure 2B:
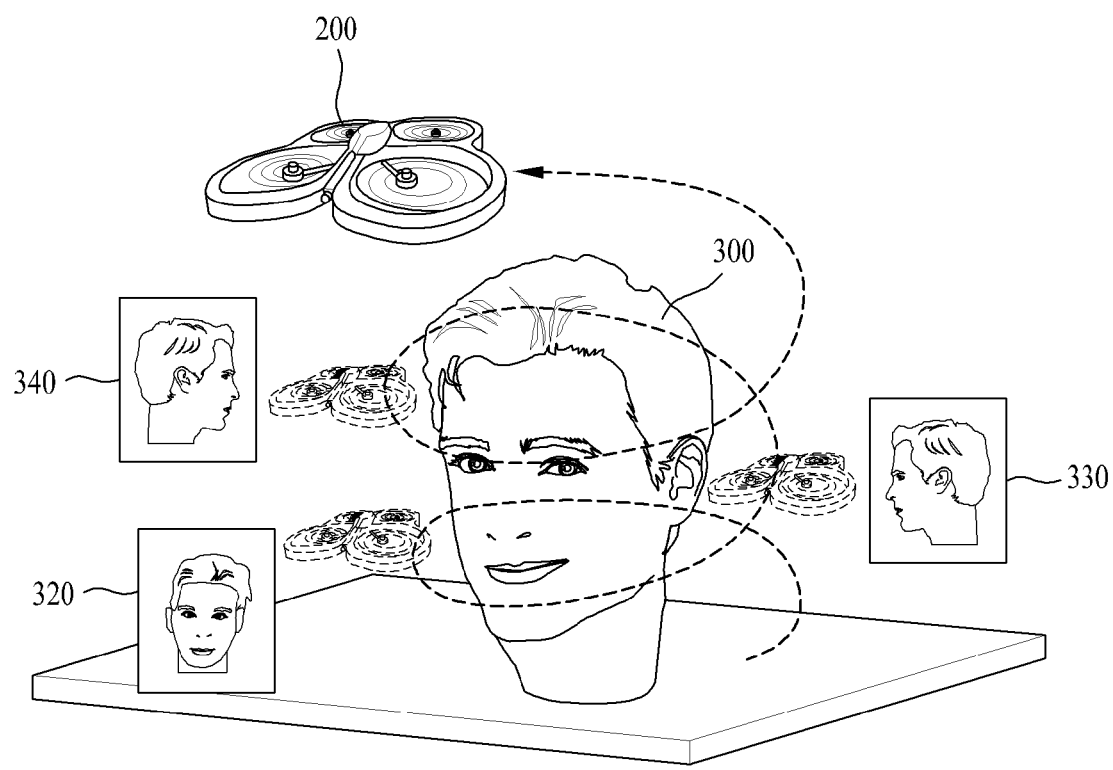

FIG. 2a and FIG. 2b are diagrams of a method for a portable device to control an unmanned aerial vehicle according to one embodiment of the present specification. The portable device 100 can obtain first image information of a target object 300 using a camera unit 110. In this case, the target object 300 may correspond to a real object captured by the portable device 100. And, the first image information can include a first image 310 corresponding to an image of the target object 300 captured in one side. As an example, the first image 310 may correspond to an image of the target object 300 captured in the front of the target object. In this case, as an example, the first image may correspond to a reference image used for generating a 3D image of the target object 300. Regarding this, it shall be described later with reference to FIG. 2b. And, as an example, the portable device 100 selects the target object 300 from a first surrounding image including the target object 300 and can obtain the first image information of the selected target object 300. More specifically, when the portable device 100 captures the target object 300, the portable device 100 can capture the first surrounding image with a frame range of the camera unit 110. In this case, if the portable device 100 detects a control input selecting the target object 300 included in the first surrounding image, the portable device 100 can obtain the first image information of the target object 300. As mentioned in the foregoing description, the first image information can include the first image 310. And, as an example, the first image information may correspond to image information obtained via an RFID, a bar code and the like included in the real object which is the target object 300. In particular, the portable device 100 can obtain the first image information of the target object in various ways using the camera unit 110, by which the present specification may be non-limited.

And, as an example, the portable device 100 can detect a control input selecting the target object 300 using a sensor unit 140. In this case, the control input may correspond to a touch input of a user. More specifically, as an example, the portable device 100 can display the captured target object 300 using a display unit 120. In this case, as an example, the displayed target object 300 may correspond to the first image 310. In particular, the portable device 100 can display a 2D image for the target object 300. In this case, the portable device 100 can select the target object 300 based on a touch input touching the 2D image for the target object 300. And, the portable device 100 can transmit a capture control signal for the selected target object 300 to the unmanned aerial vehicle 200. Regarding this, it shall be described later with reference to FIG. 2b. And, as an example, the control input may correspond to an input based on a gaze position of a user. More specifically, the sensor unit 140 detects the gaze position of the user and can select the target object 300 based on the detected gaze position. In particular, if the gaze position of the user is positioned at the displayed target object 300, the portable device 100 can select the target object 300.

Referring to FIG. 2b, the portable device 100 can transmit a capture control signal controlling image capturing for the target object 300 to the unmanned aerial vehicle 200 using the communication unit 130. In this case, as an example, if the portable device 100 detects a control input selecting the displayed target object 300, the portable device 100 can transmit the capture control signal to the unmanned aerial vehicle 200. In this case, the capture control signal may correspond to a signal controlling the image capturing in the unmanned aerial vehicle 200. In particular, the portable device 100 can control the unmanned aerial vehicle 200 based on the capture control signal. In this case, as an example, the capture control signal can include at least one selected from a group consisting of flight path information of the unmanned aerial vehicle 200, flight time information, capture location information and capture speed information. In particular, the capture control signal can include information on flight and capture of the unmanned aerial vehicle 200, by which the present specification may be non-limited.

The unmanned aerial vehicle 200 can receive a capture control signal transmitted from the portable device 100 using the communication unit 220. When the unmanned aerial vehicle 200 receives the capture control signal, the unmanned aerial vehicle 200 captures the target object 300 and can obtain second image information of the captured target object 300. More specifically, the unmanned aerial vehicle 200 can fly the target object 300, which is a real object, for a prescribed time according to a prescribed flight path based on the capture control signal. In this case, the unmanned aerial vehicle 200 can capture images for the target object while flying in accordance with the flight path. As an example, the unmanned aerial vehicle 200 can capture the target object 300 based on a predetermined capture time interval. And, as an example, the unmanned aerial vehicle 200 can capture the target object 300 in a predetermined location. In particular, the unmanned aerial vehicle 200 can capture a single image or a plurality of images for the target object 300 by a predetermined condition while flying according to the flight path. When the unmanned aerial vehicle 200 captures images for the target object 300 based on the capture control signal, the unmanned aerial vehicle 200 can capture the target object 300 in a location different from a location of the portable device 100. In particular, the unmanned aerial vehicle 200 can capture one side of the target object 300 different from a side captured by the portable device 100. In this case, as an example, the unmanned aerial vehicle 200 can capture an image of a region where the portable device is unable to capture.

The unmanned aerial vehicle 200 obtains second image information of the captured target object 300 and can transmit the second image information to the portable device 100 using the communication unit 220. In this case, as an example, the second image information can include at least one of a second image 330 corresponding to an image captured in the left side of the target object 300 and a third image 340 corresponding to an image captured in the right side of the target object 300. If the unmanned aerial vehicle 200 transmits the second image information to the portable device 100, the portable device 100 can generate a 3D image using the received second image information and the first image information directly obtained by the portable device 100. In this case, the 3D image can be generated via a plurality images obtained from the portable device 100 and the unmanned aerial vehicle 200. As an example, the 3D image can be generated in a manner of combining images captured in various sides of the target object with each other. In this case, the first image 310 captured by the portable device 100 may correspond to a reference image. More specifically, the portable device 100 can generate the 3D image by combining a plurality of the images received from the unmanned aerial vehicle 200 with each other on the basis of the first image 310. By doing so, a user can configure a reference point for the target object 300, which is to be generated as the 3D image, using the portable device 100. In particular, the user can more easily select the target object 300 using the portable device 100. And, the user can generate a delicate 3D image via collaboration of the portable device 100 and the unmanned aerial vehicle 200. And, as an example, the portable device 100 can control the unmanned aerial vehicle 200 to capture a region where it is difficult or impossible for the portable device 100 to capture. The user can generate the 3D image using both the image obtained from the portable device 100 and the image obtained from the unmanned aerial vehicle 200. By doing so, the user can increase the degree of precision of the 3D image for the target object 300.

Figure 3:
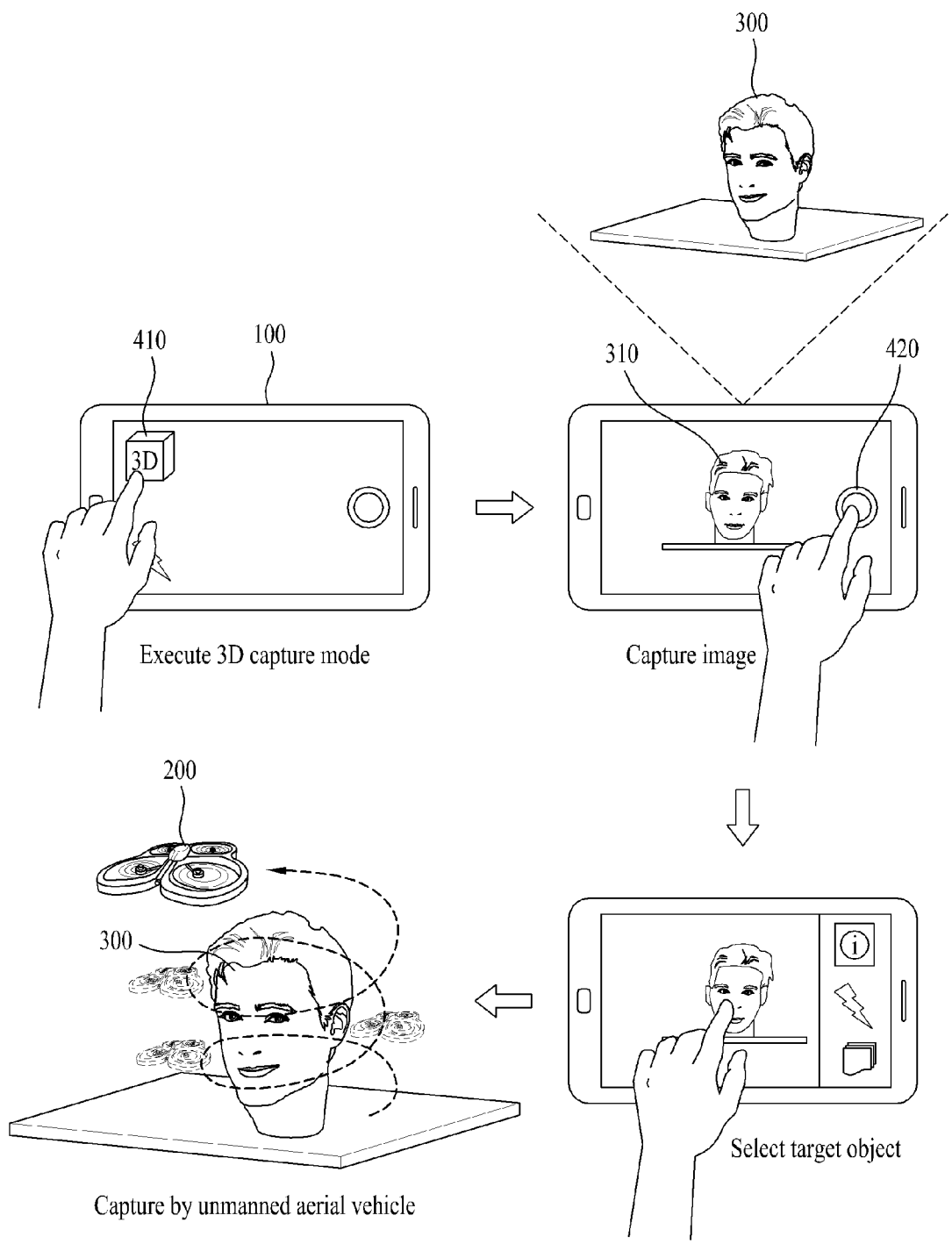
FIG. 3 is a diagram for a method of generating a 3D image using a portable device according to one embodiment of the present specification.

FIG. 3 is a diagram for a method of generating a 3D image using a portable device according to one embodiment of the present specification. The portable device 100 selects an application or a capture mode for the camera unit 110 and can generate a 3D image for the target object 300. As an example, referring to FIG. 3, the portable device 100 can execute a 3D capture mode based on a control input of a user selecting an icon 410 for executing the 3D capture mode. In this case, the 3D capture mode may correspond to a capture mode for generating a 3D image for the target object 300. The portable device 100 can capture the target object 300 in a state that the 3D capture mode is executed. In this case, the portable device 100 can obtain first image information of the target object 300. Subsequently, the portable device 100 can detect a control input selecting the displayed target object 300. In this case, as an example, the portable device 100 can select the target object 300 by an operation of capturing the target object only. When the portable device 100 selects the target object 300 in the state the 3D capture mode is executed, the portable device 100 can transmit a capture control signal to the unmanned aerial vehicle 200. The unmanned aerial vehicle 200 captures the target object 300 based on the capture control signal transmitted from the portable device 100 and can obtain second image information of the target object. Subsequently, the unmanned aerial vehicle can transmit the second image information to the portable device 100. The portable device 100 can generate a 3D image using the received second image information and the obtained first image information. In particular, the portable device 100 can control the unmanned aerial vehicle after executing the application or the capture mode for generating the 3D image for the target object 300.

Figure 4A:
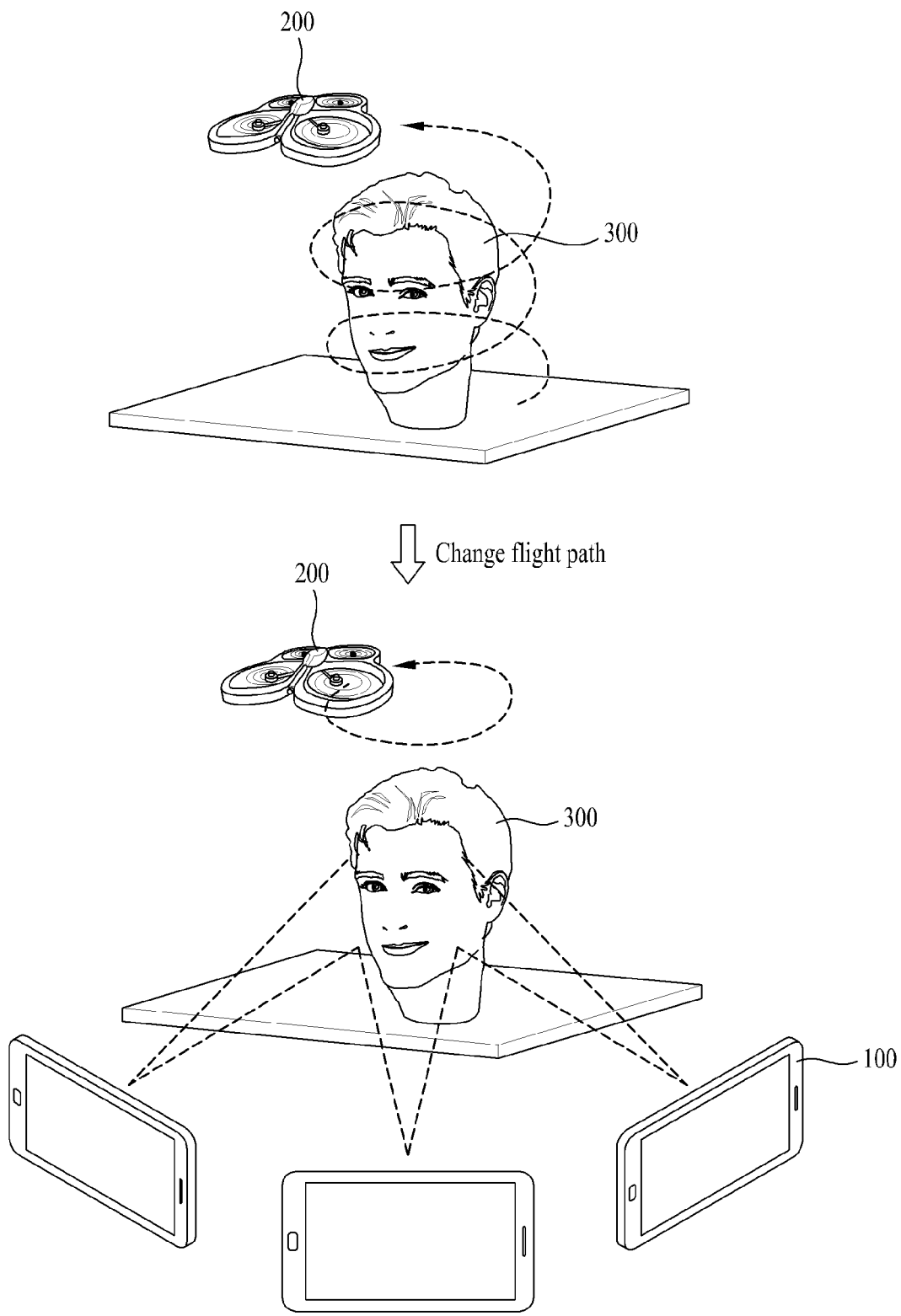

FIG. 4a and FIG. 4b are diagrams of a method for a portable device to control a flight path of an unmanned aerial vehicle according to one embodiment of the present specification. The portable device 100 can control flight information and capture information of the unmanned aerial vehicle 200 using a capture control signal, which is transmitted using the communication unit 130. More specifically, as mentioned in the foregoing description, the capture control signal can include a control command controlling the flight information and the capture information on the unmanned aerial vehicle 200. In this case, the portable device 100 can configure the capture control signal based on location information of timing on which the target object 300 is captured. As an example, the portable device 100 captures the target object in a first position corresponding to the front position of the target object 300 and can obtain a first image. In this case, the portable device 100 can control the unmanned aerial vehicle 200 to capture the target object 300 in different positions except the first position using the capture control signal. In particular, the unmanned aerial vehicle 200 captures the target object 300 in a second position different from the first position and can transmit a captured image to the portable device 100. By doing so, the portable device 100 obtains images of the target object 300 captured in various sides of the target object and can generate a 3D image.

And, as an example, referring to FIG. 4a, the portable device 100 can use all of an image captured in the front of the target object 300, an image captured in the left side of the target object and an image captured in the right side of the target object. In this case, as a different example, there may exist a plurality of portable devices 100. More specifically, images of the target object 300 may correspond to images captured in various sides of the target object 300 using a plurality of the portable devices 100, by which the present specification may be non-limited. The portable device 100 can transmit a capture control signal to the unmanned aerial vehicle 200 based on a plurality of the captured images. In this case, the unmanned aerial vehicle 200 captures an image for the upper side of the target object 300 corresponding to a region that the portable device 100 did not capture and can transmit the image to the portable device 100. More specifically, the portable device 100 can control the unmanned aerial vehicle 200 to capture the region where the portable device 100 did not capture only using the capture control signal. And, as an example, the portable device 100 can transmit a capture control signal controlling a capture location or the number of images to be captured to the unmanned aerial vehicle 200.

And, as an example, referring to FIG. 4b, the portable device 100 can obtain an image captured in the front of the target object 300. In this case, the portable device 100 sets a flight path of the unmanned aerial vehicle to remaining regions except the front of the target object and can control the unmanned aerial vehicle to capture regions where the portable device 100 did not capture.

And, as an example, the portable device 100 can control a capture control signal based on an object attribute of the target object 300. In this case, the object attribute may correspond to a shape, a size and the like of the target object 300. In particular, the portable device 100 can control the flight information and the capture information of the unmanned aerial vehicle 200 in consideration of the shape and the size of the target object 300 corresponding to a real object.

Figure 5A:
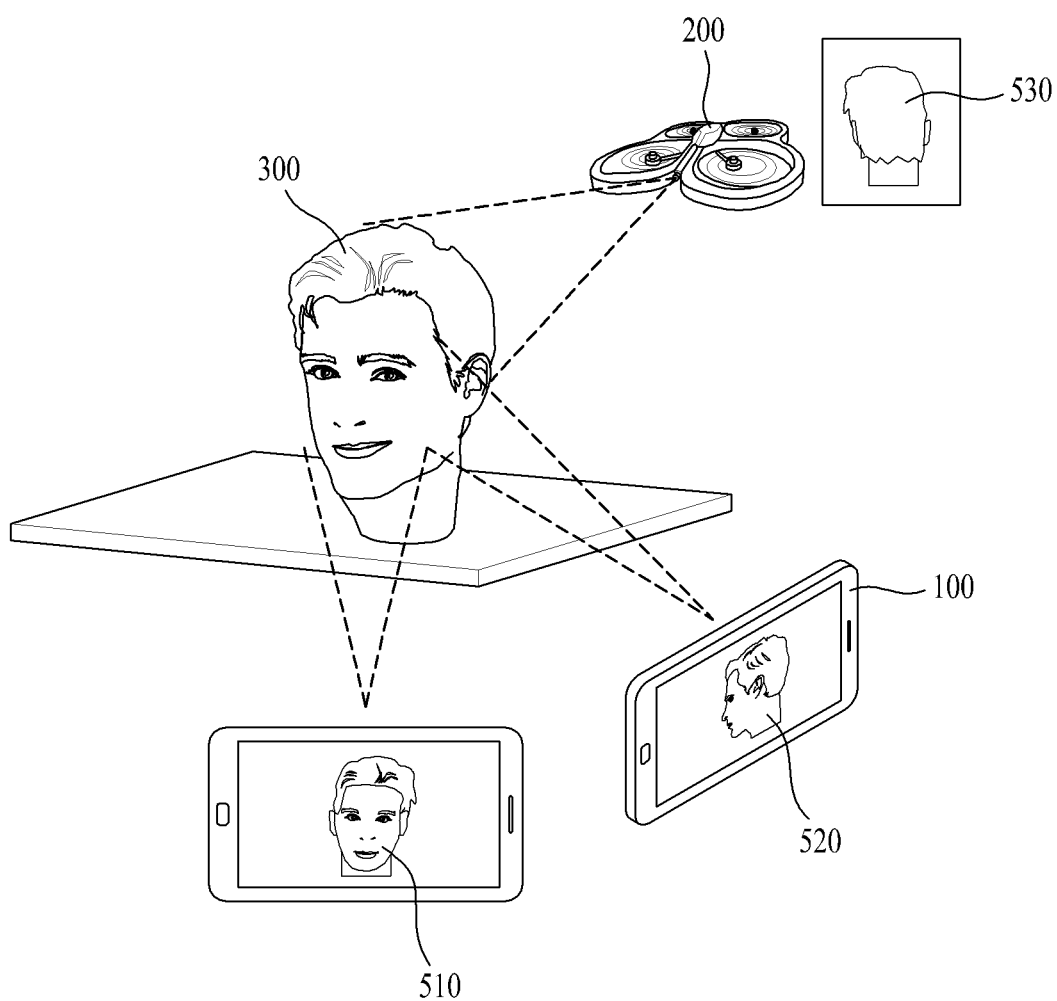
FIG. 5a and FIG. 5b are diagrams for a method of obtaining a plurality of images for a target object using a portable device according to one embodiment of the present specification.
Figure 5B:
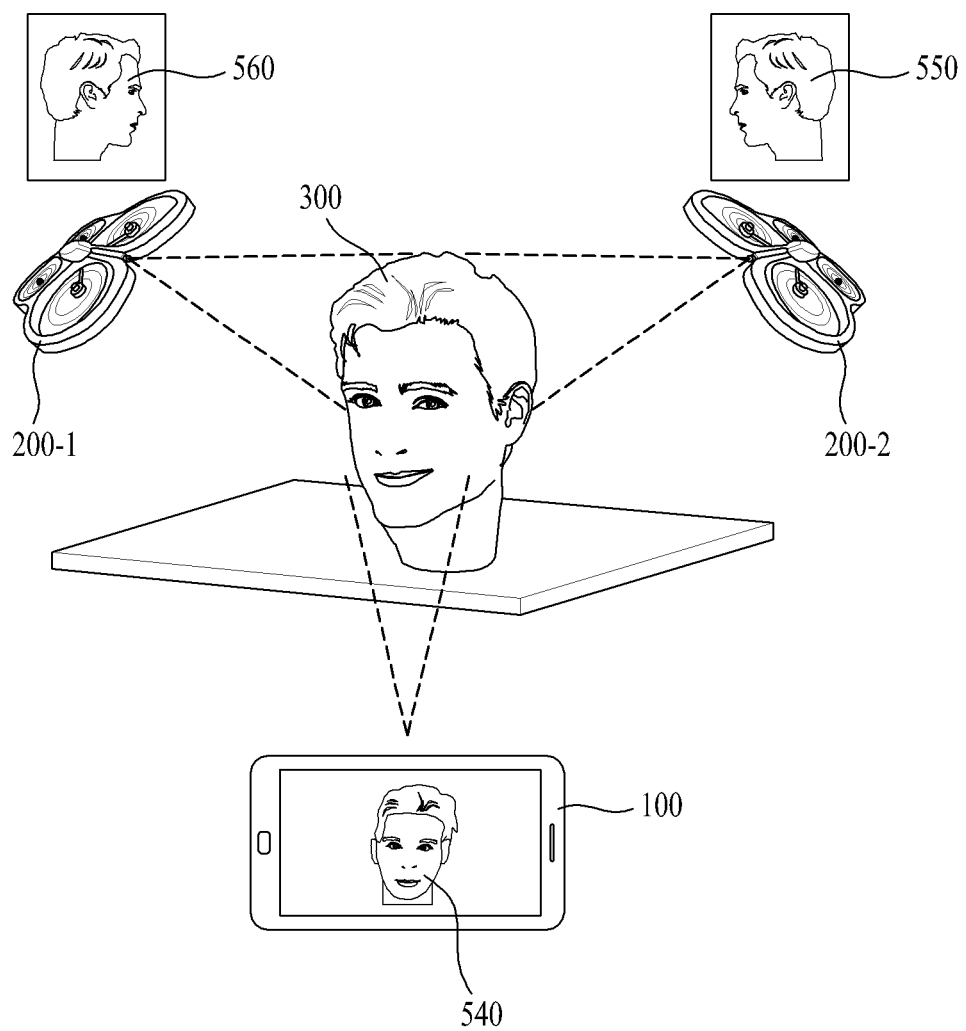

FIG. 5a and FIG. 5b are diagrams for a method of obtaining a plurality of images for a target object using a portable device according to one embodiment of the present specification.

The portable device 100 can generate a 3D image using a plurality of image information obtained by the portable device 100 and image information of the unmanned aerial vehicle. And, the portable device 100 can generate a 3D image using image information obtained by the portable device 100 and image information captured by a plurality of unmanned aerial vehicles 200-1/200-2.

In this case, as an example, referring to FIG. 5a, the portable device 100 can obtain first image information 510 from a first surrounding image captured in the front of the target object 300. In this case, as an example, the first image information 510 may correspond to information on the target object 300 included in the first surrounding image. And, the portable device 100 can obtain second image information 520 from a second surrounding image captured in the left side of the target object 300. In this case, as an example, the second image information 520 may correspond to information on the target object 300 included in the second surrounding image. And, the portable device 100 can obtain third image information 530 from a third surrounding image captured in the rear side of the target object 300 by the unmanned aerial vehicle 200. In this case, as an example, the third image information 530 may correspond to information on the target object 300 included in the third surrounding image. The portable device 100 can generate a 3D image using the first image information 510, the second image information 520 and the third image information 530. By doing so, a user can obtain a 3D image of the degree of high precision.

And, as an example, referring to FIG. 5b, the portable device 100 can obtain first image information 540 from a first surrounding image captured in the front of the target object 300. In this case, as an example, the first image information 540 may correspond to information on the target object 300 included in the first surrounding image. And, the portable device 100 can transmit a capture control signal to a first unmanned aerial vehicle 200-1 and a second unmanned aerial vehicle 200-2. In this case, the first unmanned aerial vehicle 200-1 obtains second image information 550 from a second surrounding image captured in the right side of the target object 300 and can transmit the second image information to the portable device 100. In this case, as an example, the second image information 550 may correspond to information on the target object 300 included in the second surrounding image. And, the second unmanned aerial vehicle 200-2 obtains third image information 560 from a third surrounding image captured in the left side of the target object 300 and can transmit the third image information to the portable device 100. In this case, as an example, the third image information 560 may correspond to information on the target object 300 included in the third surrounding image. The portable device 100 can generate a 3D image using the first image information 540, the second image information 550 and the third image information 560. By doing so, the portable device 100 captures the target object 300 in a manner of controlling a plurality of unmanned aerial vehicles 200-1/20012 and can generate a 3D image.

FIG. 6a to FIG. 6b are diagrams of a method for a portable device to display an image loading bar generating a 3D image according to one embodiment of the present specification.

Referring to FIG. 6a, the portable device 100 can display an image loading bar indicating the progress of generating a 3D image for the target object 300. In this case, as an example, the image loading bar can indicate the progress with a progress bar 630. And, as an example, the portable device 100 can display the image loading bar for the generation of the 3D image with at least one of a 2D image 610 and a 3D image 620. More specifically, the portable device 100 can display a process of generating a 3D image on the basis of the 2D image 610 captured in the front of the target object 300. And, the portable device 100 can display the process of generating a 3D image on the basis of the 3D image 620 for the target object 300. And, the portable device 100 can display all of the 2D image 610 and the 3D image 620 for the target object 300. In particular, the portable device 100 can show the progress of generating the 3D image for the target object 300 using the image loading bar, by which the present specification may be non-limited.

And, as an example, referring to FIG. 6b, the portable device 100 can change a method of displaying the image loading bar. As an example, the portable device 100 can detect a control input selecting an icon 640 used for switching a display mode. If the portable device 100 detects the control input on the icon 640, the portable device 100 can display flight information and capture information of the unmanned aerial vehicle 200 using the image loading bar. As an example, the portable device 100 can receive capture progress information from the unmanned aerial vehicle 200. In this case, the capture progress information can include at least one selected from the group consisting of flight path information of the unmanned aerial vehicle 200, flight time information, flight location information, capture speed information and capture location information, by which the present specification may be non-limited. By doing so, the portable device 100 can display the image loading bar showing the flight information and the capture information of the unmanned aerial vehicle 200. A user obtains information on generating a 3D image via the portable device 100 and can control the information.

And, as an example, the portable device 100 can display a preview image. In this case, the preview image may include an anticipated 3D image for a target object. And, the preview image can include a flight path of the unmanned aerial vehicle 200 and capture information of the unmanned aerial vehicle 200, by which the present specification may be non-limited.

Figure 7:
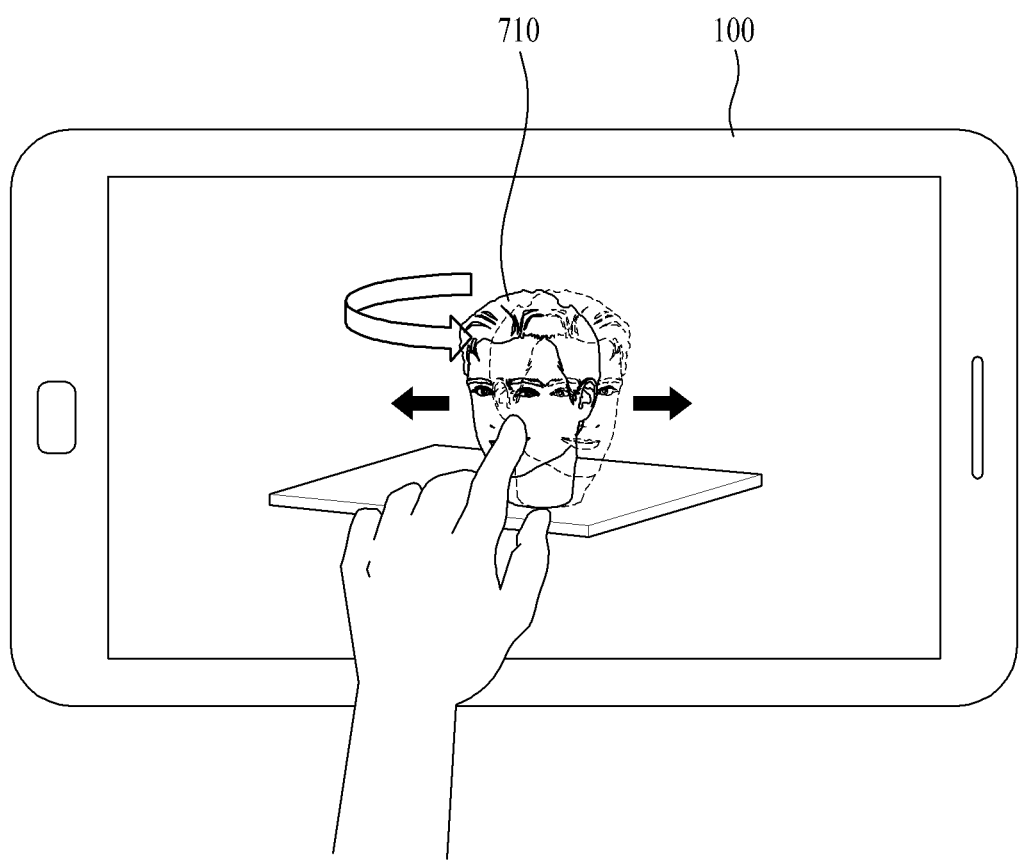
FIG. 7 is a diagram of a method for a portable device to control a generated 3D image according to one embodiment of the present specification.

FIG. 7 is a diagram of a method for a portable device to control a generated 3D image according to one embodiment of the present specification.

The portable device 100 can control a generated 3D image 710. More specifically, the portable device 100 can generate the 3D image 710 for the target object 300 using first image information obtained via the camera unit 110 and second image information obtained by the unmanned aerial vehicle 200. In this case, the portable device 100 can detect a control input controlling the 3D image generated for the target object 300. More specifically, as an example, the portable device 100 can detect the control input selecting a part of the 3D image 710. In this case, as an example, the portable device 100 can display a selected area among the 3D image 710 in a manner of expanding the selected area based on the control input. And, as an example, the portable device 100 can detect a control input rotating the 3D image 710. If the portable device 100 detects the control input rotating the 3D image 710, the portable device 100 rotates the 3D image 710 and can change a form of displaying the 3D image. More specifically, as an example, the portable device 100 can display the 3D image 710 in a form of straightly looking at the 3D image. In this case, if the portable device 100 detects the control input rotating the 3D image 710, the portable device 100 can display the 3D image 710 in a form of looking at the 3D image 710 in the side. In particular, the portable device 100 can control the method of displaying the 3D image 710 based on the control input.

FIG. 8 is a diagram of a method for a portable device to recapture a generated 3D image using an unmanned aerial vehicle according to one embodiment of the present specification.

The portable device 100 selects a recapture area 820 from a generated 3D image 810 and can transmit a recapture control signal for the selected recapture area 820 to the unmanned aerial vehicle using the communication unit 130. In this case, the recapture control signal can include at least one selected from the group consisting of flight path information of the unmanned aerial vehicle 200, flight time information, capture speed information and capture location information. The unmanned aerial vehicle 200 can receive the recapture control signal using the communication unit 220. In this case, the unmanned aerial vehicle 200 can recapture an area corresponding to the recapture area 820 among the target object 300 based on the recapture control signal. And, the unmanned aerial vehicle 200 can obtain image update information based on the captured target object 300. In this case, the image update information may correspond to an image corresponding to the recapture area 820 among the target object 300. And, as an example, the image update information may correspond to an image captured by reducing a distance between the unmanned aerial vehicle 200 and the target object 300. By doing so, the portable device can increase the degree of precision of the 3D image 810. In particular, the image update information may correspond to information making the recapture area 820, which is not a delicate part of the 3D image 810, to be delicate, by which the present specification may be non-limited. The portable device 100 can receive the image update information from the unmanned aerial vehicle 200 using the communication unit 130. In this case, the portable device 100 can update the generated 3D image 810 using the image update information. BY doing so, a user can revise or modify the displayed 3D image 810 in the portable device 100. And, the user can obtain the 3D image 810 of the degree of high precision using the portable device 100.

Figure 9:
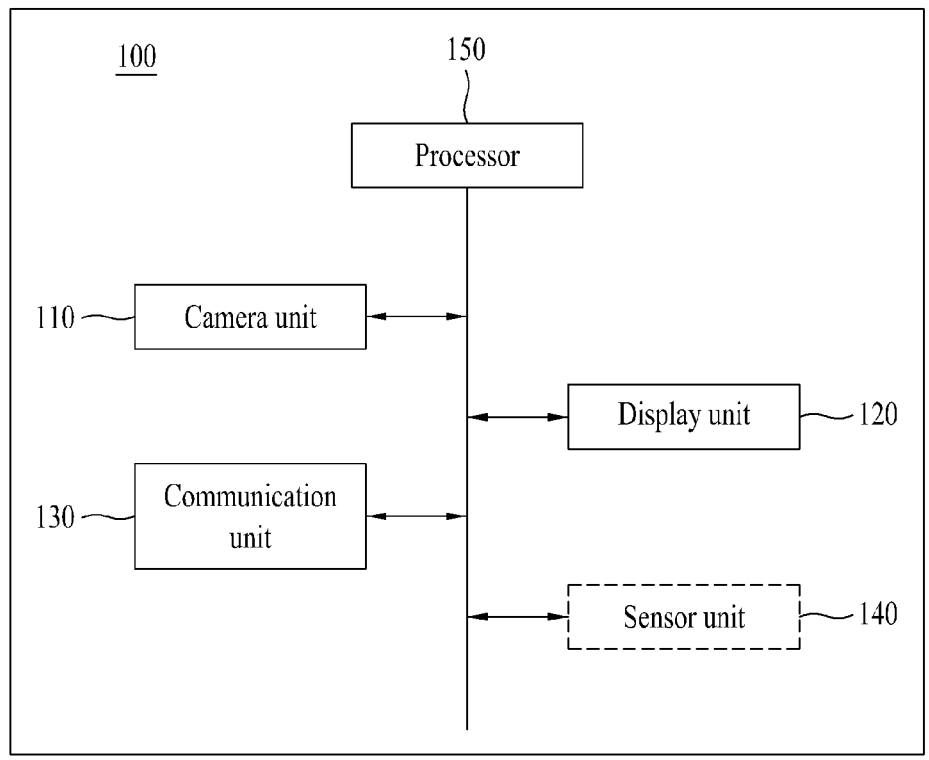
FIG. 9 is a block diagram of a portable device according to one embodiment of the present specification.

FIG. 9 is a block diagram of a portable device according to one embodiment of the present specification. The portable device can include a camera unit 110, a display unit 120, a communication unit 130 and a processor 150. And, as an example, the portable device 100 can further include a sensor unit 140. In this case, the aforementioned units can be implemented in the portable device 100 in a manner of being combined with each other in a hardware manner. And, as an example, the aforementioned units can deliver a command for an operation between the units using an electrical signal in the portable device 100. In particular, the aforementioned units can operate by an interaction in a manner of being organically combined with each other.

The camera unit 110 captures a surrounding image of the portable device 100 and can store the surrounding image as an image. More specifically, the camera unit 110 captures an image of an environment surrounding the portable device 100 and can convert the image into an electrical signal. To this end, the camera unit 110 can include an image sensor. The image sensor can convert an optical signal into an electrical signal. The image captured by the camera unit 110 and converted into the electrical signal is stored in a storage unit (not depicted) and then outputted by the processor 150. Or, the image can be immediately outputted by the processor 150 without being stored. In particular, the camera unit 110 can be controlled by the processor 150. And, as an example, the camera unit 110 can detect a real object positioned near the portable device 100. In this case, the camera unit 110 captures the aforementioned real object and can obtain image information on the real object. In this case, the image information may correspond to a 2D image captured in one side of the real object. And, the image information may correspond to information obtained via an RFID, a bar code and the like including the information on the real object, by which the present specification may be non-limited. And, the processor 150 can select the real object as a target object using the camera unit 110.

The display unit 120 can display visual information. More specifically, the display unit 120 can display a 2D image for the real object captured by the camera unit 110. And, as an example, the display unit 120 can display a 3D image generated for the real object. In this case, the display unit 120 may correspond to a touch sensitive display unit detecting a touch input of a user. In particular, the display unit 120 displays visual information and can detect a user input based on the visual information. And, according to embodiment, the display unit 120 can include at least one selected from the group consisting of an OLED (organic light-emitting diode), a LCD (liquid crystal display), an E-ink, a HMD (head mounted display) and a flexible display.

The communication unit 130 performs a communication with the unmanned aerial vehicle 200 or an external device using various protocols. By doing so, the communication unit can transceive data with the unmanned aerial vehicle 200 or the external device. And, the communication unit 130 can transmit a control command controlling the unmanned aerial vehicle 200 to the unmanned aerial vehicle 200. And, the communication unit 130 accesses a network in wired or wireless and can control the unmanned aerial vehicle 200. In particular, the communication unit 130 may correspond to a unit configured to perform information exchange and command delivery with the unmanned aerial vehicle 200, by which the present specification may be non-limited.

And, as an example, the communication unit 130 can transmit a signal searching for the unmanned aerial vehicle 200 to the unmanned aerial vehicle 200. In this case, the unmanned aerial vehicle 200 can transmit information based on the signal delivered via the communication unit 130 to the portable device 100. And, as an example, the communication unit 130 and a communication unit 220 of the unmanned aerial vehicle 200 can communicate with each other in wireless. To this end, radio frequency communication, Bluetooth, WiFi, 3rd generation and $4^{th}$ generation radio communication or a random radio communication can be used.

The portable device 100 can further include a sensor unit 140. In this case, the sensor unit 140 detects an input signal and can deliver the detected input signal to the processor. In this case, the input signal may correspond to one selected from the group consisting of a touch input, inclination of the portable device, input device input, an audio input and a gesture input. And, the input signal may correspond to a control input of a user controlling the portable device, by which the present specification may be non-limited. And, the sensor unit 140 can include an input device (not depicted) to detect the input signal. As an example, the sensor unit 140 can detect various control inputs using at least one selected from the group consisting of a touch sensor, a gyro sensor, an acceleration sensor, an image sensor and a voice recognition sensor, by which the present specification may be non-limited. The sensor unit 140 delivers the detected input signal to the processor and the processor can control the portable device 100 using the delivered input signal.

The processor 150 may correspond to a unit controlling at least one selected from the group consisting of the camera unit 110, the display unit 120, the communication unit 130 and the sensor unit 140. More specifically, the processor 150 can obtain image information on a target object using the camera unit 110. In this case, as an example, the processor 150 selects the target object captured by the camera unit 110 and can obtain the image information on the selected target object. And, the processor 150 can transmit a capture control signal controlling image capture for the aforementioned target object to the unmanned aerial vehicle 200 using the communication unit 130. In this case, as an example, the processor 150 can transmit the capture control signal to the unmanned aerial vehicle 200 using the communication unit 130 based on the selected target object. And, the processor 150 can control the capture control signal based on a location of the portable device 100, an attribute of the target object and the like. The processor 150 can control flight and capturing of the unmanned aerial vehicle 200 via the capture control signal. And, the processor 150 can receive image information obtained by the unmanned aerial vehicle 200. In this case, as an example, the image information may correspond to an image for the target object captured by the camera unit 210 of the unmanned aerial vehicle 200. In this case, the image may correspond to a 2D captured in one side of the target object. And, as an example, the image information can include a plurality of images captured in various sides of the target object.

And, the processor 150 can generate a 3D image for the target object using the image information obtained via the portable device 100 and the image information obtained via the unmanned aerial vehicle 200. In particular, the processor 150 can generate a 3D image via a plurality of image information for the target object in a manner of controlling the camera unit 110 of the portable device 100 and the camera unit 210 of the unmanned aerial vehicle 200. In this case, the 3D image may correspond to an image displayed via the display unit 120 for the images of an identical form of the target object.

And, the aforementioned elements can be included in the portable device 100 as a separate element or can be included in the portable device 100 in a manner of being integrated into at least one element.

Figure 10:
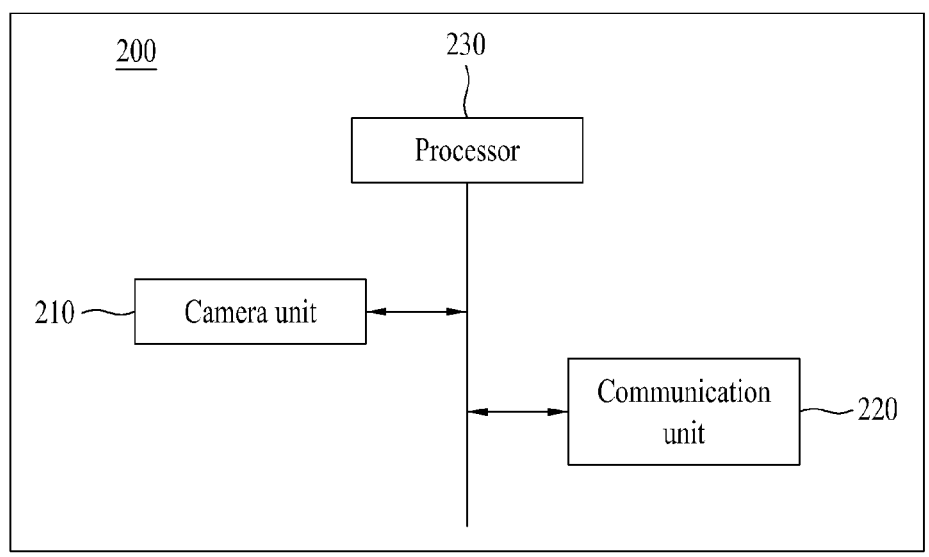
FIG. 10 is a block diagram of an unmanned aerial vehicle according to one embodiment of the present specification.

FIG. 10 is a block diagram of an unmanned aerial vehicle according to one embodiment of the present specification. The unmanned aerial vehicle 200 can include a camera unit 210, a communication unit 220 and a processor 230.

The camera unit 210 captures a surrounding image of the unmanned aerial vehicle 200 and can store the surrounding image as an image. More specifically, the camera unit 210 captures an image of an environment surrounding the unmanned aerial vehicle 200 and can convert the image into an electrical signal. To this end, the camera unit 210 can include an image sensor. The image sensor can convert an optical signal into an electrical signal. The image captured by the camera unit 210 and converted into the electrical signal is stored in a storage unit (not depicted) and can be transmitted to the portable device using the communication unit 220. In this case, the processor 230 can control the camera unit 210 and the communication unit 220. And, as an example, the camera unit 210 can capture an image for a target object configured by the portable device 100. More specifically, the camera unit 210 can capture images while the unmanned aerial vehicle 200 is flying according to a flight path. By doing so, the unmanned aerial vehicle 200 can transmit a plurality of images captured in various sides of the target object to the portable device.

The communication unit 220 performs a communication with the portable device 100 or an external device using various protocols. The communication unit 220 can transceive data with the portable device 100 or the external device using the various protocols. In this case, the data can include at least one selected from the group consisting of image information, text information and audio information, by which the present specification may be non-limited. And, the communication unit 220 can receive a control command from the portable device 100. In this case, as an example, the control command may correspond to a capture control signal. In particular, the communication unit 230 may correspond to a unit configured to perform information exchange and command delivery with the portable device 100, by which the present specification may be non-limited.

And, as an example, the communication unit 220 can communicate with the communication unit 130 of the portable device 100 with each other in wireless. To this end, radio frequency communication, Bluetooth, WiFi, $3^{rd}$ generation and $4^{th}$ generation radio communication or a random radio communication can be used.

The processor 230 may correspond to a unit controlling at least one of the camera unit 210 and the communication unit 220. More specifically, the processor 230 can obtain image information on a target object using the camera unit 210. In this case, as an example, the processor 230 can capture the target object using the camera unit 210 based on a capture control signal received from the portable device 100. And, as an example, the processor 230 can obtain image information on the target object from a surrounding image captured by the camera unit 210. And, the processor 230 can transmit the image information on the target object to the portable device 100. In particular, the processor 230 may correspond to a unit configured to control the camera unit 210 and the communication unit 220 based on a control command of the portable device 100.

And, the aforementioned elements can be included in the unmanned aerial vehicle 200 as a separate element or can be included in the unmanned aerial vehicle 200 in a manner of being integrated into at least one element.

Figure 11:
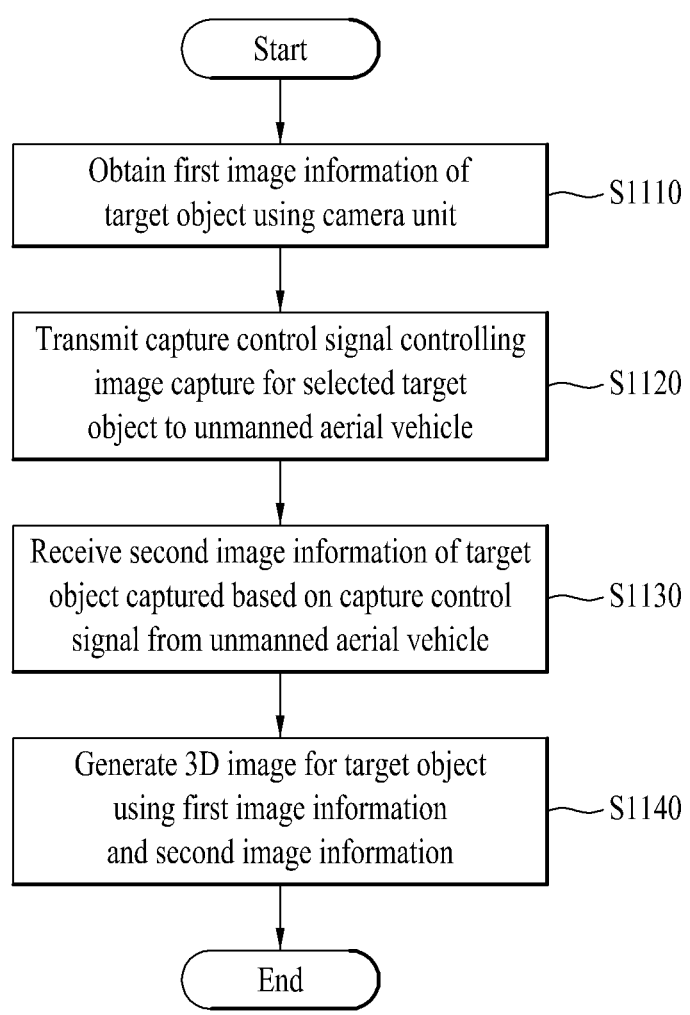
FIG. 11 is a flowchart for a method of controlling a portable device according to one embodiment of the present specification.

FIG. 11 is a flowchart for a method of controlling a portable device according to one embodiment of the present specification.

The portable device 100 can obtain first image information of a target object using a camera unit 110 [S1110]. As mentioned earlier in FIG. 2a and FIG. 2b, the target object 300 may correspond to a real object captured by the portable device 100. And, the first image information can include a first image corresponding to an image captured the target object in one side of the target object 300. As an example, the first image may correspond to an image captured the target object 300 in the front. In this case, as an example, the first image may correspond to a reference image used for generating a 3D image of the target object 300. And, as an example, the first image information may correspond to image information obtained via an RFID, a bar code and the like included in a real object, which is the target object 300. In particular, the portable device 100 can obtain the first image information of the target object in various ways using the camera unit 110, by which the present specification may be non-limited.

The portable device 100 can transmit a capture control signal controlling image capturing for the target object to the unmanned aerial vehicle [S1120]. As mentioned earlier in FIG. 2a and FIG. 2b, the portable device 100 can transmit the capture control signal controlling image capturing for the target object 300 to the unmanned aerial vehicle 200 using the communication unit 130. In this case, as an example, if the portable device 100 detects a control input selecting the displayed target object 300, the portable device can transmit the capture control signal to the unmanned aerial vehicle 200. In this case, the capture control signal may correspond to a signal controlling image capturing in the unmanned aerial vehicle 200. In particular, the portable device 100 can control the unmanned aerial vehicle 200 based on the capture control signal. In this case, as an example, the capture control signal can include at least one selected from the group consisting of flight path information of the unmanned aerial vehicle 200, flight time information, capture location information and capture speed information, by which the present specification may be non-limited. And, the unmanned aerial vehicle 200 can receive the capture control signal transmitted from the portable device 100 using the communication unit 220. As mentioned in the foregoing description, the capture control signal can include a control command controlling flight information on the unmanned aerial vehicle 200.

The portable device 100 can receive second image information of the target object which is captured based on the capture control signal from the unmanned aerial vehicle 200 [S1130]. As mentioned earlier in FIG. 2a and FIG. 2b, if the unmanned aerial vehicle 200 receives the capture control signal, the unmanned aerial vehicle 200 captures the target object 300 and can obtain the second image information of the captured target object 300. More specifically, the unmanned aerial vehicle 200 can fly the target object 300, which is a real object, for a prescribed time according to a flight path based on the capture control signal. In this case, the unmanned aerial vehicle 200 can capture an image for the target object while flying according to the flight path. As an example, the unmanned aerial vehicle 200 can capture the target object 300 based on a predetermined capturing time interval. And, as an example, the unmanned aerial vehicle 200 can capture the target object 300 in a predetermined location. In particular, the unmanned aerial vehicle 200 can capture a single image or a plurality of images for the target object 300 while flying according to the flight path. If the unmanned aerial vehicle 200 captures the image for the target object 300 based on the capture control signal, the unmanned aerial vehicle 200 can capture the target object 300 in a location different from a location of the portable device 100. In particular, the unmanned aerial vehicle 200 can capture an image of a region where the portable device 100 is unable to capture.

The portable device 100 can generate a 3D image for the target object using the first image information and the second image information [S1140]. As mentioned earlier in FIG. 2a and FIG. 2b, the 3D image may correspond to an image of a form identical to the target object 300. In this case, as an example, the 3D image can be generated via a plurality of images obtained from the portable device 100 and the unmanned aerial vehicle 200. More specifically, the 3D image can be generated in a manner of combining images captured in various sides of the target object with each other. In this case, as an example, a first image captured in the portable device 100 may correspond to a reference image. More specifically, the portable device 100 can generate the 3D image in a manner of combining a plurality of the images received from the unmanned aerial vehicle 200 with each other on the basis of the first image. By doing so, a user can configure a reference point for the target object 300, which is to be generated as the 3D image, using the portable device 100. In particular, the user can more easily select the target object 300 using the portable device 100. And, the user can generate a 3D image via collaboration of the portable device 100 and the unmanned aerial vehicle 200. And, as an example, the portable device 100 can control the unmanned aerial vehicle 200 to capture a region where it is difficult or impossible for the portable device 100 to capture. By doing so, the user can generate the 3D image using both the portable device 100 and the unmanned aerial vehicle 200. By doing so, the user can increase the degree of precision of the 3D image for the target object 300.

For clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A portable device 100 according to the present specification and a method of controlling therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a portable device 100 according to the present specification and a method of controlling therefor can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the interne and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on both of the inventions can be complementally applied, if necessary.

What is claimed is:

1. A portable device controlling an unmanned aerial vehicle capturing an image, comprising:
    a camera unit configured to capture a target object;
    a display unit configured to display visual information;
    a communication unit configured to communicate with the unmanned aerial vehicle (UAV); and
    a processor configured to control the camera unit, the display unit and the communication unit,
    wherein the processor is further configured to:
    obtain first image information of the target object using the camera unit,
    transmit a capture control signal controlling image capture for the target object to the unmanned aerial vehicle,
    receive second image information of the target object captured based on the capture control signal from the unmanned aerial vehicle,
    generate a 3D image corresponding to the target object using the first image information and the second image information.

2. The portable device of claim 1, wherein the capture control signal comprises at least one selected from a group consisting of flight path information of the unmanned aerial vehicle, flight time information, capture location information and capture speed information.

3. The portable device of claim 1, wherein the processor is further configured to set the capture control signal based on location information of the portable device at a time point of capturing the target object.

4. The portable device of claim 1, wherein the first image information comprises a first image of the target object captured in a first location by the portable device.

5. The portable device of claim 4, wherein the second image information comprises a second image of the target object captured in a second location by the unmanned aerial vehicle, and
wherein the second location is different from the first location.

6. The portable device of claim 5, wherein the second image corresponds to an image of the target object captured based on the capture control signal while the unmanned aerial vehicle is flying according to a flight path.

7. The portable device of claim 1, wherein the processor is further configured to set the capture control signal based on an object property of the target object.

8. The portable device of claim 7, wherein the object property comprises at least one of a shape and a size of the target object.

9. The portable device of claim 1, further comprising a sensor unit configured to detect a touch input of a user, and to deliver the detected touch input to the processor.

10. The portable device of claim 9, wherein the processor is further configured to:
display the captured target object using the display unit,
select the target object based on the touch input touching the displayed target object, and
transmit the capture control signal for the selected target object to the unmanned aerial vehicle.

11. The portable device of claim 1, further comprising a sensor unit configured to detect a gaze position of a user, and to deliver the detected gaze position of the user to the processor.

12. The portable device of claim 11, wherein the processor is further configured to:
display the captured target object using the display unit,
select the target object when the gaze position of the user is detected in a point in which the target object is displayed, and
transmit the capture control signal for the selected target object to the unmanned aerial vehicle.

13. The portable device of claim 1, wherein the processor is further configured to:
execute a 3D capture mode, and
transmit the capture control signal for the target object to the unmanned aerial vehicle when the target object is selected in a state in which the 3D capture mode is executed.

14. The portable device of claim 1, wherein the processor is further configured to display an image loading a bar representing a progress of generating the 3D image when the 3D image of the target object is generated.

15. The portable device of claim 14, wherein the processor is further configured to:
receive capture progress information from the unmanned aerial vehicle, and
display the image loading bar based on the capture progress information.

16. The portable device of claim 1, wherein the processor is further configured to:
select a recapture area from the generated 3D image,
transmit a recapture control signal for the selected recapture area to the unmanned aerial vehicle,
receive image update information for the captured target object from the unmanned aerial vehicle based on the recapture control signal, and
update the 3D image based on the received image update information.

17. The portable device of claim 1, wherein the processor is further configured to:
transmit a sub-capture control signal controlling image capture for the selected target object to a sub-unmanned aerial vehicle,
receive third image information of the target object captured by the sub-unmanned aerial vehicle based on the sub-capture control signal, and
generate a 3D image corresponding to the target object using the first image information, the second image information and the third image information.

18. The portable device of claim 1, wherein the processor is further configured to:
capture a first surrounding image containing the target object using the camera unit, and
obtain the first image information of the target object from the captured first surrounding image.

19. The portable device of claim 18, wherein the processor is further configured to:
capture a second surrounding image containing the target object using the camera unit,
obtain third image information of the target object from the captured second surrounding image, and
generate a 3D image corresponding to the target object further using the first image information, the second image information and the third image information.

20. A method of controlling a portable device controlling an unmanned aerial vehicle capturing an image, comprising the steps of:
obtaining first image information of a target object using a camera unit;
transmitting a capture control signal controlling image capture for the target object to the unmanned aerial vehicle;
receiving second image information of the target object captured based on the capture control signal from the unmanned aerial vehicle; and
generating a 3D image corresponding to the target object using the first image information and the second image information.

* * * * *